United States Patent
McQueeny

[11] Patent Number: 5,832,654
[45] Date of Patent: Nov. 10, 1998

[54] SELF-SETTING FISHING LURE

[76] Inventor: Thomas Patrick McQueeny, 4732 N. Manor, Chicago, Ill. 60625

[21] Appl. No.: 893,444

[22] Filed: Jul. 11, 1997

[51] Int. Cl.⁶ ................................................. A01K 85/00
[52] U.S. Cl. ............................ 43/42.04; 43/15; 43/42.15
[58] Field of Search ..................... 43/15, 42.04, 42.15, 43/42.35

[56]  References Cited

U.S. PATENT DOCUMENTS

| | | |
|---|---|---|
| 283,444 | 8/1883 | Wentworth . |
| 1,383,474 | 7/1921 | Lucas . |
| 1,558,916 | 10/1925 | Pennell . |
| 2,079,335 | 5/1937 | Pflueger ........................................ 43/47 |
| 2,204,560 | 6/1940 | Allison . |
| 2,481,453 | 9/1949 | Stadelhofer ................................. 43/15 |
| 2,530,007 | 11/1950 | Euzent ......................................... 43/15 |
| 2,560,875 | 7/1951 | Knott ........................................... 43/15 |
| 2,567,340 | 9/1951 | Lytle . |
| 2,582,758 | 1/1952 | Rose ............................................ 43/15 |
| 2,585,783 | 2/1952 | Johnston ................................. 43/42.13 |
| 2,724,202 | 11/1955 | Heyman ..................................... 43/15 |
| 2,801,487 | 8/1957 | Morgan . |
| 3,006,102 | 10/1961 | Chapman .................................... 43/42 |
| 3,060,615 | 10/1962 | Spets . |
| 3,314,185 | 4/1967 | McCoy et al. .............................. 43/15 |
| 3,660,922 | 5/1972 | Chill ............................................ 43/15 |
| 3,771,250 | 11/1973 | Helmke ....................................... 43/15 |
| 3,823,501 | 7/1974 | Bybee .......................................... 43/15 |
| 3,974,588 | 8/1976 | Blom et al. ................................. 43/15 |
| 5,438,788 | 8/1995 | Rich ............................................ 43/15 |

*Primary Examiner*—Jack W. Lavinder
*Attorney, Agent, or Firm*—Marshall, O'Toole, Gerstein, Murray & Borun

[57]  ABSTRACT

In order to increase the ability to catch a fish, a self-setting fishing lure includes a body having a forward end and a rear end and having an opening in the rear end leading to a hollow interior region. The self-setting fishing lure includes a coil spring within the hollow interior region of the body extensible from an unloaded position to a loaded position wherein the coil spring has a forward end secured to the body and a rear end extending toward the rear of the body, and also includes a bridge member having a forward end secured to the rear end of the coil spring and a hook associated with the bridge member. Additionally, the self-setting fishing lure is formed to have a forwardly inclined catch for the purpose of engaging the rear end of the body when the coil spring is in the loaded position.

12 Claims, 5 Drawing Sheets

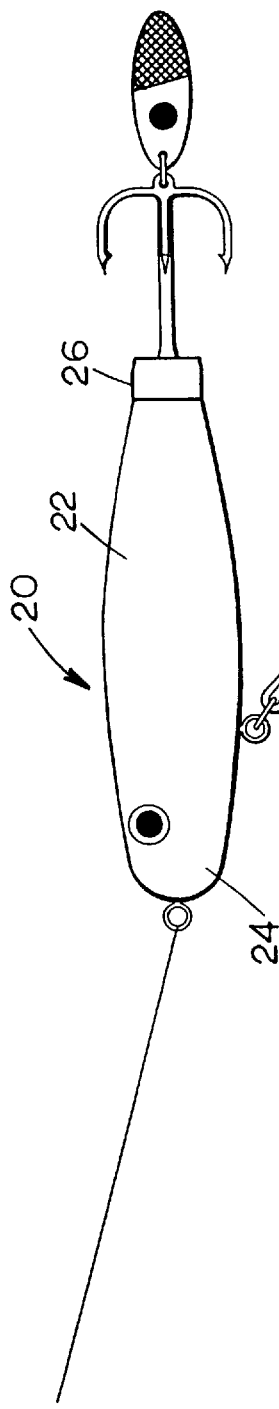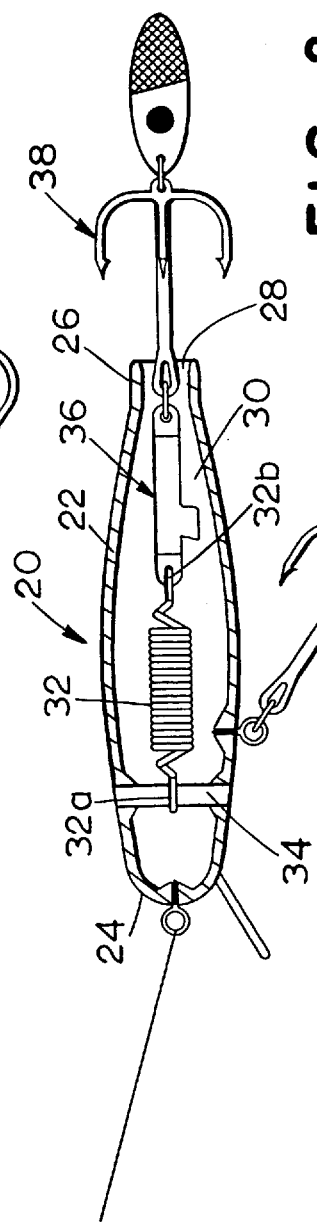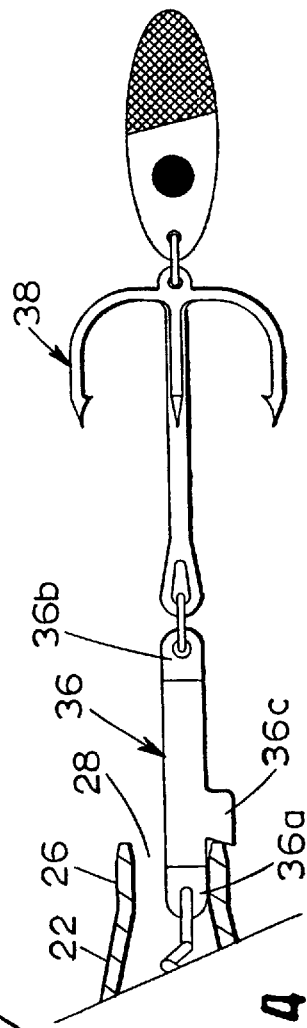

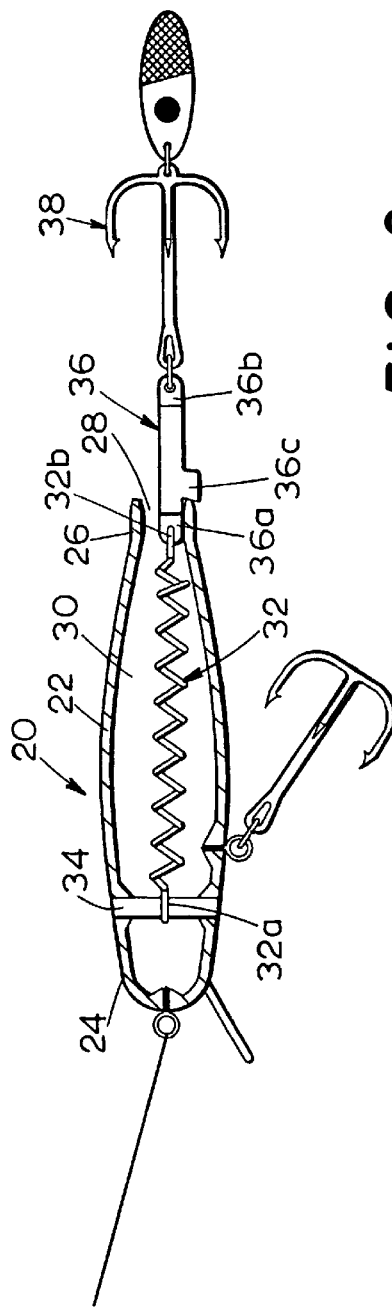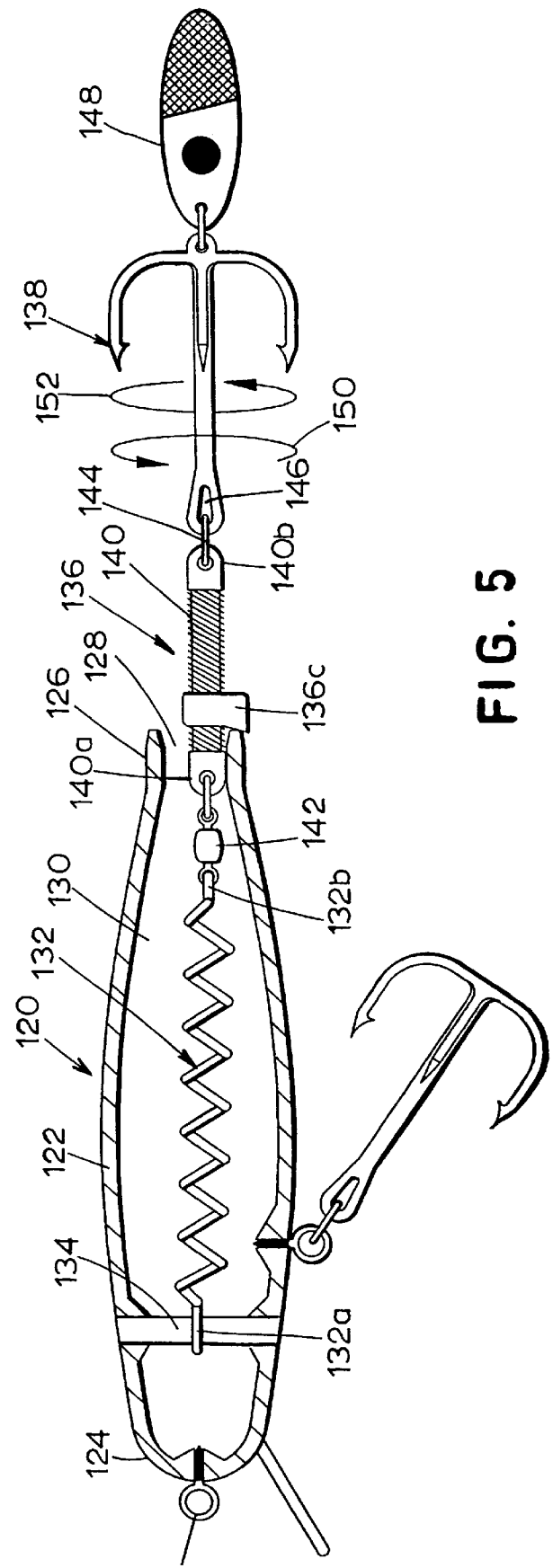

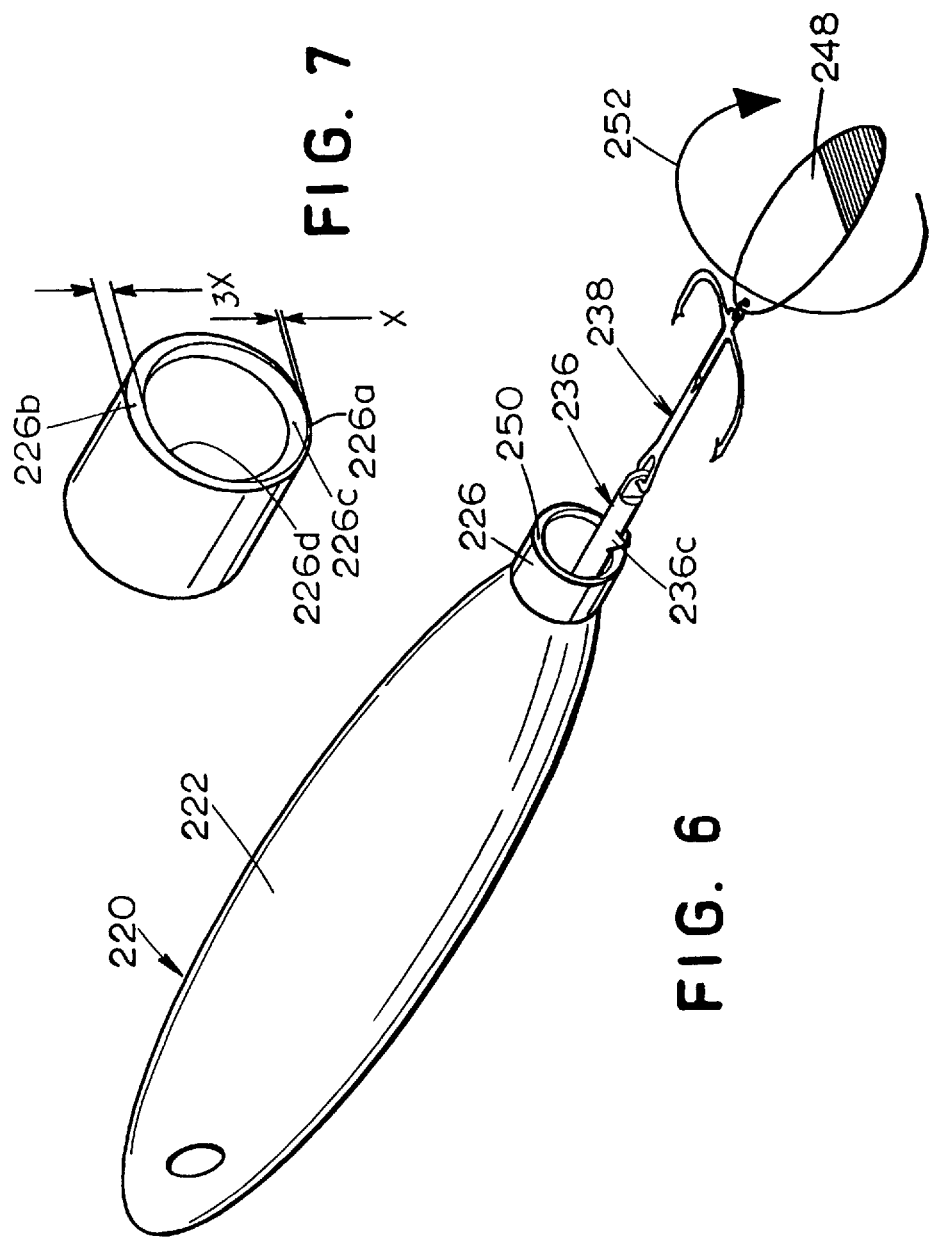

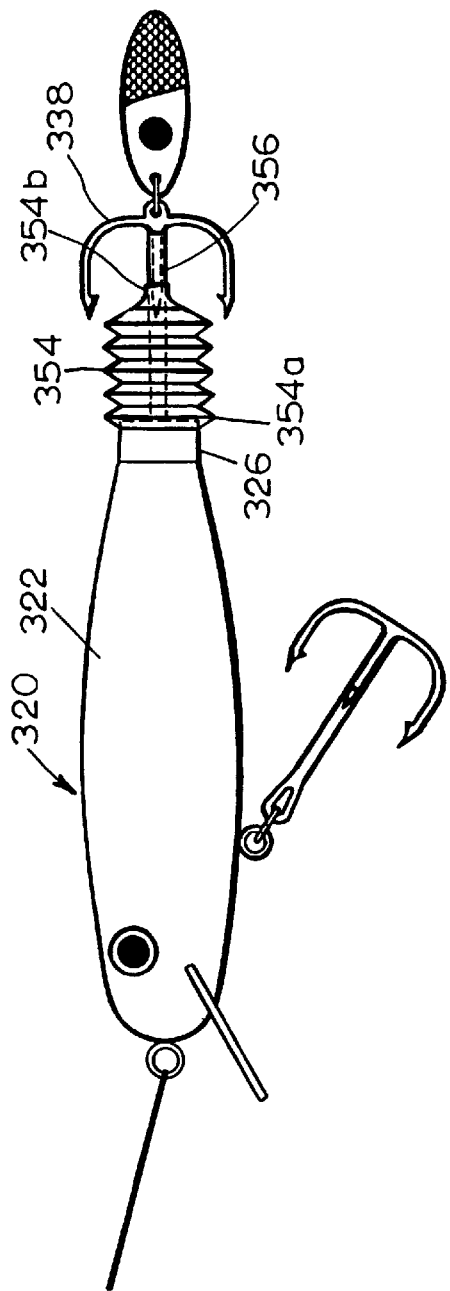
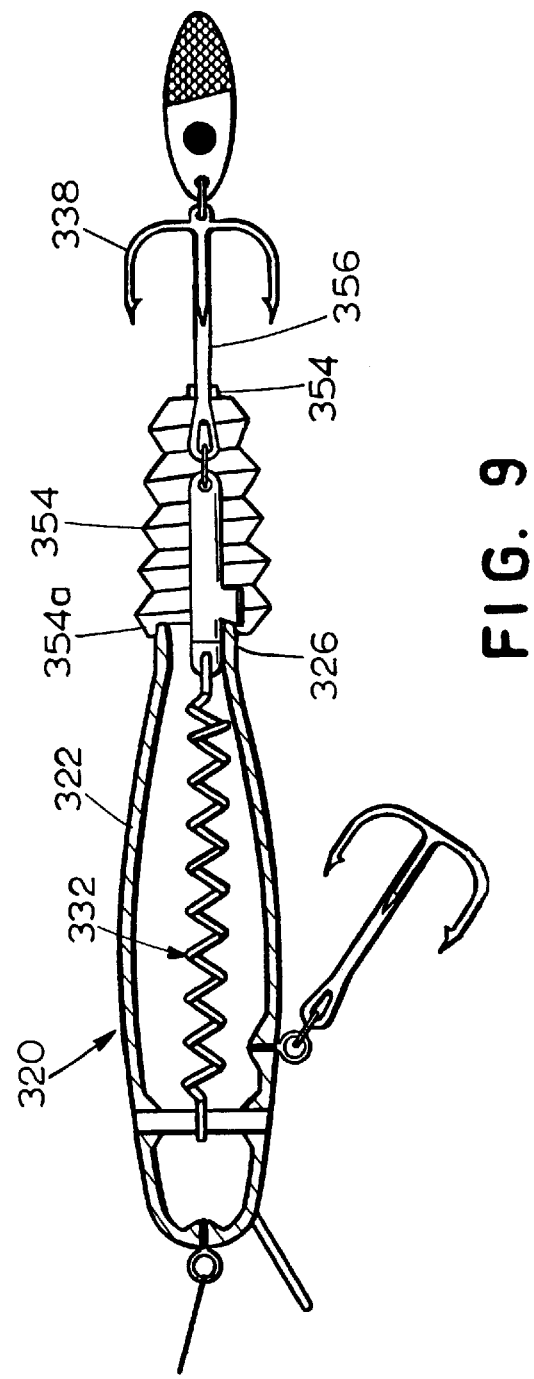

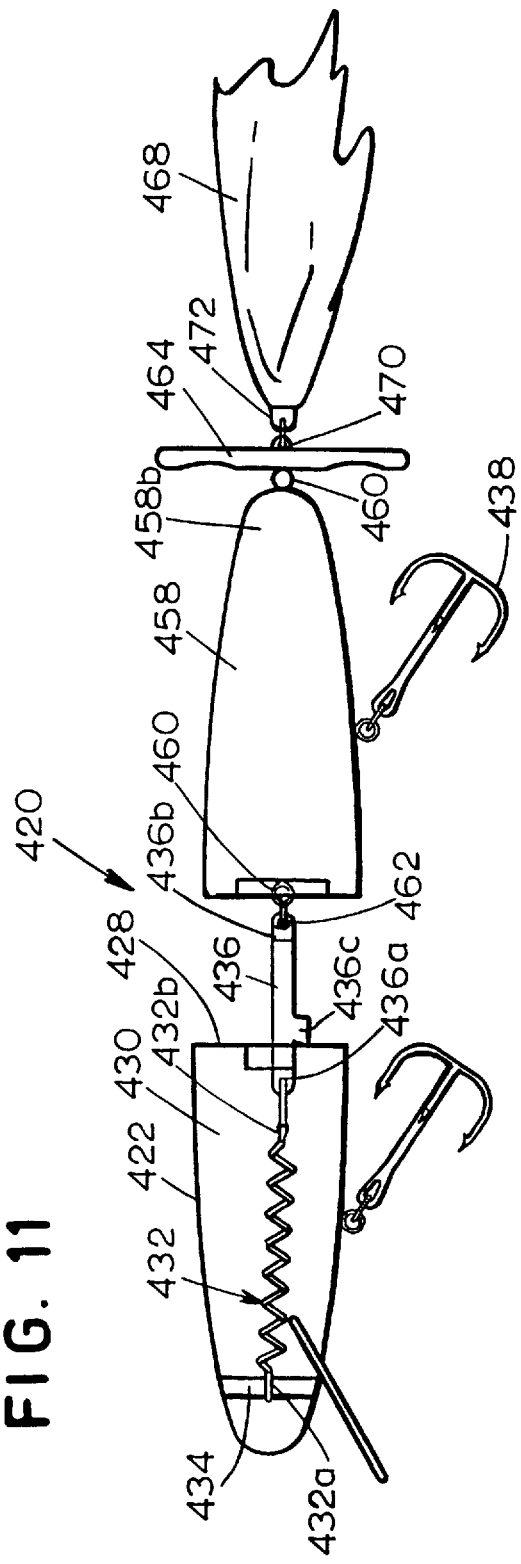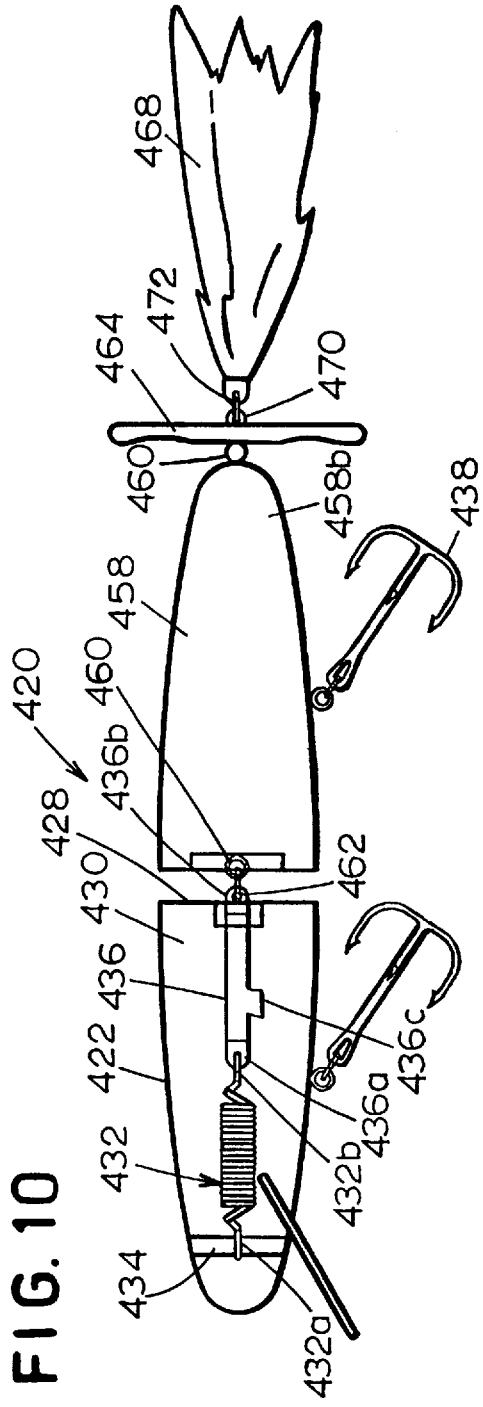

SELF-SETTING FISHING LURE

FIELD OF THE INVENTION

The present invention is generally directed to fishing lures and, more particularly, a fishing lure that is self-setting responsive to a fish strike.

BACKGROUND OF THE INVENTION

Since the earliest of times, there have been efforts to improve upon the techniques and equipment that are utilized in fishing. These efforts have seen the development of sophisticated equipment that is highly specialized to the point where specific types of fishing lures and bait are known to be most effective when fishing for particular types of fish. As a result, anglers now have many choices when it comes to fishing, and they have far greater success than in years past.

Despite this fact, significant problems have remained that have not been fully resolved by existing techniques and equipment. These include the fact that, even with the same type of fishing lure or bait, some anglers are far more successful in landing fish, particularly in relation to other, less experienced ones. Generally speaking, this is believed to be due in no small part to the difficulties that are encountered in the course of setting the hook.

More specifically, setting the hook is something that is easy to understand but difficult to master in the absence of years of experience. The art of setting the hook requires a keen sense of timing, i.e., the angler must give highly focused attention, must have quick reflexes that are developed from years of experience, and must have an awareness of the tension and variations in tension that exist in the fishing line. Moreover, due to the distance between the rod and the fishing lure or bait, the fish strike may not be sensed in sufficient time to permit the setting of the hook.

For these reasons, there have been a number of extremely diverse attempts to develop a fully satisfactory self-setting fishing lure, and these attempts have met with varying degrees of success. Among them are the techniques which are disclosed in Wentworth U.S. Pat. No. 283,444; Pennell U.S. Pat. No. 1,558,916; Euzent U.S. Pat. No. 2,530,007; Knott U.S. Pat. No. 2,560,875; Rose U.S. Pat. No. 2,582,758; Heyman U.S. Pat. No. 2,724,202; McCoy et al. U.S. Pat. No. 3,314,185; and Blom et al. U.S. Pat. No. 3,974,588. Despite these attempts, self-setting fishing lures or bait have not met with commercial success due to the fact that they have been less than entirely satisfactory in one or more very important respects.

For instance, these prior attempts at providing self-setting fishing lures have oftentimes been overly complex. This has meant that they either would not function as intended or they would be inordinately expensive to manufacture and purchase. Further, they have usually been manufactured in a manner that is not conducive to other attributes that are important in fishing lure construction.

The present invention is directed to overcoming one or more of the foregoing problems and achieving one or more of the resulting objects.

SUMMARY OF THE INVENTION

It is a principal object of the present invention to provide a self-setting fishing lure that overcomes the disadvantages of prior attempts. It is a further object of the present invention to provide a self-setting fishing lure that ensures a positive self-setting action at the appropriate time while also accommodating sensitivity adjustability in order to permit an angler to vary the sensitivity of the self-setting feature. It is an additional object of the present invention to provide a self-setting fishing lure having applicability to lures for a variety of fish.

Accordingly, the present invention is directed to a self-setting fishing lure comprising a body having a forward end and a rear end and having an opening in the rear end leading to a hollow interior region. The lure also has spring means within the hollow interior region of the body extensible from an unloaded position to a loaded position wherein the spring means has a forward end secured to the body and a rear end extending toward the rear end of the body to which a bridge member and a hook associated with the bridge member are secured. Specifically, the bridge member has a forward end secured to the rear end of the spring means, and also has a forwardly inclined catch for engaging the rear end of the body when the spring means is in the loaded position.

In the exemplary embodiment, the spring means comprises a coil spring and the forward end of the coil spring is secured to a post integral with the body near the forward end thereof. It is also advantageous for the bridge member to be generally rod-like and for the forwardly inclined catch to comprise a radial enlargement intermediate the forward and rear ends thereof. In a highly preferred embodiment, the bridge member is a threaded rod and the forwardly inclined catch is threadably adjustable on the threaded rod between the forward and rear ends thereof.

In one highly advantageous embodiment, the rear end of the body is generally tubular shaped and has a variable thickness at the rearwardmost edge substantially about the circumference thereof. Preferably, for one application of the self-setting fishing lure, it includes a bellows having a forward end in sealing engagement with the rear end of the body and having a rear end in sealing engagement with a shank portion of the hook. In yet another embodiment, the self-setting fishing lure includes a second body secured to a rear end of the bridge member so as to be movable relative to the bridge member and the body having the hollow interior region.

In the last-mentioned embodiment, the hook is secured to the second body which also advantageously includes a handle on a rearwardmost end for engaging the catch with the rear end of the first of the bodies.

Other objects, advantages and features of the present invention will become apparent from a consideration of the following specification taken in conjunction with the accompanying drawings.

BRIEF DESCRIPTION OF THE DRAWINGS

FIG. 1 is a side elevational view of a self-setting fishing lure constructed in accordance with the present invention;

FIG. 2 is a longitudinal cross-sectional view of the self-setting fishing lure illustrating the hook in an unloaded position;

FIG. 3 is a longitudinal cross-sectional view of the self-setting fishing lure illustrating the hook in a loaded position;

FIG. 4 is an enlarged detail view of the rear end of the self-setting fishing lure in the form illustrated in FIG. 3;

FIG. 5 is a longitudinal cross-sectional view of another embodiment of self-setting fishing lure having sensitivity adjustment;

FIG. 6 is a perspective view of another embodiment of self-setting fishing lure having another form of sensitivity adjustment;

FIG. 7 is an enlarged detail view of the rear end of the self-setting fishing lure in the form illustrated in FIG. 6;

FIG. 8 is a side elevational view of yet another embodiment of self-setting fishing lure in accordance with the present invention;

FIG. 9 is a longitudinal cross-sectional view of the embodiment of self-setting fishing lure in the form illustrated in FIG. 8;

FIG. 10 is a longitudinal cross-sectional view of an additional embodiment of self-setting fishing lure in an unloaded position; and FIG. 11 is a longitudinal cross-sectional view of the self-setting fishing lure in the form illustrated in FIG. 10 but in a loaded position.

DETAILED DESCRIPTION OF THE PREFERRED EMBODIMENT

In the illustrations given, and with reference first to FIGS. 1–4, the reference numeral 20 designates generally a self-setting fishing lure in accordance with the present invention. The fishing lure 20 includes a body 22 having a forward end 24 and a rear end 26 and having an opening 28 in the rear end 26 leading to a hollow interior region 30. It will also be seen to include spring means such as the coil spring 32 within the hollow interior region 30 of the body 22 which is extensible from an unloaded position (see FIG. 2) to a loaded position (see FIGS. 3 and 4). The fishing lure 20 is formed with the coil spring 32 having a forward end as at 32a secured to the body 22 and a rear end as at 32b extending toward the rear end 28 of the body 22. In the illustrated embodiment, the forward end 32a of the coil spring 32 is secured to a post 34 which is made integral with the body 22 at a point near the forward end 24 thereof.

As will also be appreciated from FIGS. 1–4, the self-setting fishing lure 20 includes a bridge member 36 having a forward end 36a secured to the rear end 32b of the coil spring 32 and a hook 38 is associated with the bridge member 36. Specifically, the bridge member 36 will be seen to have a catch 36c with a forwardly inclined surface for engaging the rear end 28 of the body 22 when the coil spring 32 is in the loaded position (see FIG. 3). Still referring to FIGS. 1–4, the bridge member 36 will be seen to be generally rod-like and the forwardly inclined catch 36c will be seen to comprise a radial enlargement which is positioned intermediate the forward and rearward ends 36a and 36b thereof.

Referring now to FIG. 5, a self-setting fishing lure 120 is illustrated that is substantially identical in every respect with the exception of certain differences in the bridge member 136. The bridge member 136 in this embodiment comprises a threaded rod 140 and the forwardly inclined catch 136c is threadably adjustable on the threaded rod 140 between the forward and rearward ends 140a and 140b thereof. As will be appreciated from FIG. 5, the forward end 140a of the threaded rod 140 is secured to the rear end 132b of the coil spring 132 and the rear end 140b is secured to the hook 138.

As with the embodiment described in conjunction with FIGS. 1–4, the self-setting fishing lure 120 includes a body 122 having a forward end 124 and a rear end 126. It will also be appreciated that the body 122 has an opening 128 in the rear end 126 which leads to a hollow interior region 130. Still additionally, the forward end 132a of the coil spring 132 is secured to a post 134 which is made integral with the body 122 near the forward end 124 thereof.

As shown in FIG. 5, the forward end 140a of the threaded rod 140 is secured to the rear end 132b of the coil spring 132 through a swivel member 142. It will also be seen and appreciated that the hook 138 is secured to the rear end 140b of the threaded rod 140 by means of a connecting loop 144. More specifically, the loop 144 suitably extends through a hole in the rear end 140b of the threaded rod 136 and through an eyelet 146 in the hook 138.

Still referring to FIG. 5, the hook 138 will be seen to have a visual fish attractor 148 secured thereto, and certain unique aspects of the hook 138 will be described in detail hereinafter. For present purposes, the visual fish attractor and grip for loading and adjusting 148 can be turned clockwise (see arrow 150) or counterclockwise (see arrow 152) to threadably adjust the position of the forwardly inclined catch 136c. As will be appreciated, the visual fish attractor 148 provides a flat surface that can be knurled to further enhance the ability to grip it for loading and adjusting purposes.

Due to the fact that the visual fish attractor is rearwardly of the hook 138, it will be understood that it also has the important function of permitting loading and/or adjusting in a manner that renders it highly unlikely that an angler will be injured by reason of the sharp barbs on the hook 138.

As for the swivel 142, it is provided to prevent winding of the coil spring 132 in either the clockwise or counterclockwise direction which could cause damage to the spring when the visual fish attractor 148 is being utilized to make an adjustment. Thus, by utilizing the visual fish attractor 148 to turn the hook and, in turn, the threaded rod 140 in either the clockwise or counterclockwise direction, it is possible to threadably adjust the position of the forwardly inclined catch 136c toward or away from the forward end 140a of the threaded rod 140 without causing winding of the coil spring 132. When the forwardly inclined catch 136c is nearest the forward end 140a of the threaded rod 140, the self-setting fishing lure 120 has the greatest setting force and, conversely, it has the least setting force when it is nearest the rear end 140b.

While still referring to FIG. 5, the addition of the visual fish attractor 148 makes it possible to grip a flat, knurled surface rearwardly of the barbs on the hook 138 to place the forwardly inclined catch 136c in the loaded position and to threadably adjust its position to thereby adjust the sensitivity of the lure 120.

Referring now to FIGS. 6 and 7, the fishing lure 220 is generally identical to the fishing lure 20 illustrated and described in relation to FIGS. 1–4 with the exception that it has a different form of sensitivity adjustment. It will be seen from FIGS. 6 and 7 that the rear end 226 of the body 222 is generally tubular shaped and has a variable thickness at the rearwardmost edge 250 substantially about the circumference thereof and, more particularly, the variable thickness at the rear end 226 of the body 222 varies between a dimension x at a thinnest point 226a and a dimension 3x at a thickest point 226b diametrically opposite the thinnest point 226a. As also shown in FIG. 7, the rear end 226 of the body 222 has an inwardly and forwardly tapered inner surface 226c at the thinnest point 226a gradually blending into a cylindrical inner surface 226d at the thickest point 226b.

With this construction, the visual fish attractor 248 attached to the hook 238 can be gripped and turned as illustrated by the arrow 252 to place the forwardly inclined catch 236c on the bridge member 236 in engagement with the thinnest point 226a, the thickest point 226b, or any point therebetween.

Because of the limited surface engaging the forwardly inclined catch 236c at the thinnest point 226a, the self-setting fishing lure 220 will be most sensitive in this position. It will likewise be understood that due to the large surface area at the thickest point 226b in engagement with the forwardly inclined catch 236c that the self-setting fishing lure 220 will be the least sensitive in this position. Because of the varying thickness, the sensitivity of the self-setting fishing lure 220 can be infinitely varied by choosing any position between the thinnest point 226a and the thickest point 226b.

For certain types of fishing, it is preferable to have a fishing lure that rides on the surface of the water, and this type of fishing lure incorporating the advantages of the present invention is generally designated as 320 in FIGS. 8 and 9. The lure 320 is highly effective for surface fishing while also utilizing the unique self-setting feature of the present invention. As shown in FIGS. 8 and 9, the self-setting fishing lure 320 is identical in nearly every respect to the fishing lure 20 illustrated in FIGS. 1–4 with the exception that it incorporates an expandable and contractible bellows 354.

More specifically, the bellows 354 will be seen to have a forward end 354a in sealing engagement with the rear end 326 of the body 322. It will also be appreciated that the bellows 354 has a rear end 354b in sealing engagement with a shank portion 356 of the hook 338. By comparing FIGS. 8 and 9, the bellows 354 is illustrated when the coil spring 332 is in the unloaded and loaded positions, respectively.

As for other details of the self-setting fishing lure 320, they can be identical to those described in connection with FIGS. 1–4, FIG. 5, and/or FIGS. 6 and 7 and, thus, will not be described in detail since reference may be had to the detailed description that has already been provided in conjunction with these respective embodiments.

In yet another type of fishing, it is sometimes desirable to provide a jointed lure especially for large fish such as muskie. A jointed lure of this type, which may be quite large, e.g., on the order of 12 inches to 14 inches in size, is designated by reference numeral 420 in FIGS. 10 and 11 wherein the former view illustrates the lure in an unloaded position whereas the latter view illustrates the lure in a loaded position. In many respects, the self-setting fishing lure 420 is identical to the other embodiments that have been described in detail hereinabove.

Referring to FIGS. 10 and 11, the self-setting fishing lure 420 will be understood to have a first body 422 and a second body 458 and a coil spring 432 within a hollow interior region 430 of the body 422 which is extensible from an unloaded position (see FIG. 10) to a loaded position (see FIG. 11). The coil spring 432 has a forward end 432a secured to a post 434 which is made integral with the body 422 and a rear end 432b extending toward the rear end of the body 422. As with the earlier embodiments, the self-setting fishing lure 420 has a bridge member 436 with a forward end 436a secured to the rear end 432b of the coil spring 432 and a forwardly inclined catch 436c is provided for engaging the rear end 428 of the body 422 when the coil spring 432 is in the loaded position (see FIG. 11).

As mentioned, the self-setting fishing lure 420 includes the second body 458 which is secured to a rear end 436b of the bridge member 436. It will be appreciated that the second body 458 is secured by means such as an eyelet 460 and a loop fastener 462 so as to be movable relative to the bridge member 436 and relative to the body 422 having the hollow interior region 430. With this arrangement, the hook 438 is secured to the second body 458 which is movable in relation to the body 422 as previously described.

With the embodiment illustrated in FIGS. 10 and 11, the self-setting fishing lure 420 also advantageously includes a handle 464 connected to the rearwardmost end 458b of the second body 458 by means such as a spacer washer 466. The handle 464 advantageously comprises a spinning Tee handle which makes it possible to use the handle 464 to "load" the lure by pulling against the coil spring 432 to engage the forwardly inclined catch 436c with the rear and 428 of the body 422 and it also advantageously serves as a spinner to create turbulence in the water for the purpose of attracting fish. For large fish such as muskie, the self-setting fishing lure 420 can also advantageously utilize a tail 468 secured to an eyelet 470 on the rear of the handle 464 by means such as a loop connector 472.

While in the foregoing there have been set forth preferred embodiments of the invention, it will be appreciated that the details herein given may be varied by those skilled in the art without departing from the true spirit and scope of the appended claims.

I claim:

1. A self-setting fishing lure, comprising:

a body having a forward end and a rear end and having an opening in said rear end leading to a hollow interior region;

spring means within said hollow interior region of said body extensible from an unloaded position to a loaded position;

said spring means having a forward end secured to said body and a rear end extending toward said rear end of said body;

said spring means comprising a coil spring and said forward end of said coil spring being secured to a post integral with said body near said forward end thereof;

a bridge member having a forward end secured to said rear end of said spring means and a hook associated with said bridge member;

said bridge member having a forwardly inclined catch for engaging said rear end of said body when said spring means is in said loaded position;

said bridge member being a threaded rod and said forwardly inclined catch being threadably adjustable on said threaded rod between said forward and rear ends thereof;

said rear end of said body being generally tubular shaped and having a variable thickness at the rearwardmost edge substantially about the circumference thereof.

2. The self-setting fishing lure of claim 1 including a bellows having a forward end in sealing engagement with said rear end of said body and having a rear end in sealing engagement with a shank portion of said hook.

3. The self-setting fishing lure of claim 1 wherein said variable thickness at said rear end of said body varies between a dimension x at a thinnest point and a dimension 3x at a thickest point diametrically opposite said thinnest point.

4. The self-setting fishing lure of claim 3 wherein said rear end of said body has an inwardly and forwardly tapered inner surface at said thinnest point gradually blending into a cylindrical inner surface at said thickest point.

5. The self-setting fishing lure of claim 1 including a second body secured to a rear end of said bridge member so as to be movable relative to said bridge member and said body having said hollow interior region.

6. The self-setting fishing lure of claim 5 wherein said hook is secured to said second body and said second body includes a handle on a rearwardmost end for engaging said catch with said rear end of the first of said bodies.

7. A self-setting fishing lure, comprising:

a body having a forward end and a rear and having an opening in said rear end leading to a hollow interior region;

spring means within said hollow interior region of said body extensible from an unloaded position to a loaded position;

said spring means having a forward end secured to said body and a rear end extending toward said rear end of said body;

a bridge member having a forward end secured to said rear end of said spring means and a hook associated with said bridge member;

said bridge member having a forwardly inclined catch for engaging said rear end of said body when said spring means is in said loaded position;

said bridge member being a threaded rod and said forwardly inclined catch being threadably adjustable on said threaded rod between said forward and rear ends thereof.

8. A self-setting fishing lure, comprising:

a body having a forward end and a rear end and having an opening said rear end leading to a hollow interior region;

spring means within said hollow interior region of said body extensible from an unloaded position to a loaded position;

said spring means having a forward end secured to said body and a rear end extending toward said rear end of said body;

a bridge member having a forward end secured to said rear end of said spring means and a hook associated with said bridge member;

said bridge member having a forwardly inclined catch for engaging said rear end of said body when said spring means is in said loaded position;

said rear end of said body comprising a generally tubular shaped wall having a circumferential rearwardmost edge having a variable thickness varying gradually substantially about the entire circumference of the rearwardmost edge.

9. A self-setting fishing lure, comprising:

a body having a forward end and a rear end and having an opening in said rear end leading to a hollow interior region;

spring means within said hollow interior region of said body extensible from an unloaded position to a loaded position;

said spring means having a forward end secured to said body and a rear extending toward said rear end of said body;

a bridge member having a forward end secured to said rear end of said spring means and a hook associated with said bridge member;

said bridge member having a forwardly inclined catch for engaging said rear end of said body when said spring means is in said loaded positions; and a bellows having a forward end in sealing engagement with said rear end of said body and having a rear end in sealing engagement with a shank portion of said hook.

10. A self-setting fishing lure, comprising:

a body having a forward end and a rear end and having an opening in said rear end leading to a hollow interior region;

spring means within said hollow interior region of said body extensible from an unloaded position to loaded position;

said spring means having a forward end secured to said body and a rear end extending toward said rear end of said body;

said spring means comprising a coil spring and said forward end of said coil spring being secured to a post integral with said body near said forward end thereof;

a bridge member having a forward end secured to said rear end of said spring means and a hook associated with said bridge member;

said bridge member having a forwardly inclined catch for engaging said rear end of said body when said spring means is in said loaded position;

said bridge member being generally rod-like and said forwardly inclined catch comprising a radial enlargement intermediate said forward and rear ends thereof;

said bridge member being a threaded rod and said forwardly inclined catch being threadably adjustable on said threaded rod between said forward and rear ends thereof.

11. A self-setting fishing lure, comprising:

a body having a forward end and a rear end and having an opening in said rear end leading to a hollow interior region;

spring means within said hollow interior region of said body extensible from an unloaded position to a loaded position;

said spring means having a forward end secured to said body and a rear end extending toward said rear end of said body;

said spring means comprising a coil spring and said forward end of said coil spring being secured to a post integral with said body near said forward end thereof;

a bridge member having a forward end secured to said rear end of said spring means and a hook associated with said bridge member;

said bridge member having a forwardly inclined catch for engaging said rear end of said body when said spring means is in said loaded position;

said bridge member being generally rod-like and said forwardly inclined catch comprising a radial enlargement intermediate said forward and rear ends thereof;

said rear end of said body comprising a generally tubular shaped wall having a circumferential rearwardmost edge having a variable thickness varying gradually substantially about the entire circumference of the rearwardmost edge.

12. A self-setting fishing lure, comprising:

a body having a forward end and a rear end and having an opening in said rear end leading to a hollow interior region;

spring means within said hollow interior region of said body extensible from an unloaded position to a loaded position;

said spring means having a forward end secured to said body and a rear end extending toward said rear end of said body;

said spring means comprising a coil spring and said forward end of said coil spring being secured to a post integral with said body near said forward end thereof;

a bridge member having a forward end secured to said rear end of said spring means and a hook associated with said bridge member;

said bridge member having a forwardly inclined catch for engaging said rear end of said body when said spring means is in said loaded position;

said bridge member being generally rod-like and said forwardly inclined catch comprising a radial enlargement intermediate said forward and rear ends thereof; and a bellows having a forward end in sealing engagement with said rear end of said body and having a rear end in sealing engagement with a shank portion of said hook.

* * * * *